(12) United States Patent
Takeda

(10) Patent No.: US 7,068,086 B2
(45) Date of Patent: Jun. 27, 2006

(54) PHASE CORRECTION CIRCUIT

(75) Inventor: Akihiro Takeda, Tokyo (JP)

(73) Assignee: Advantest Corp., Tokyo (JP)

( * ) Notice: Subject to any disclaimer, the term of this patent is extended or adjusted under 35 U.S.C. 154(b) by 77 days.

(21) Appl. No.: 10/484,984

(22) PCT Filed: Jul. 26, 2002

(86) PCT No.: PCT/JP02/07607

§ 371 (c)(1),
(2), (4) Date: Aug. 26, 2004

(87) PCT Pub. No.: WO03/010674

PCT Pub. Date: Feb. 6, 2003

(65) Prior Publication Data

US 2005/0001655 A1    Jan. 6, 2005

(30) Foreign Application Priority Data

Jul. 27, 2001 (JP) .............................. 2001-227746

(51) Int. Cl.
*H03L 7/00* (2006.01)
(52) U.S. Cl. ...................... 327/161; 327/237
(58) Field of Classification Search ............... None
See application file for complete search history.

(56) References Cited

U.S. PATENT DOCUMENTS

| | | | | |
|---|---|---|---|---|
| 5,886,552 A * | 3/1999 | Chai et al. | ................ | 327/165 |
| 5,936,450 A * | 8/1999 | Unger | ................ | 327/237 |
| 6,121,815 A | 9/2000 | Terada et al. | | |
| 6,265,904 B1 * | 7/2001 | Killorn | ................ | 327/12 |
| 6,556,640 B1 * | 4/2003 | Baba | ................ | 375/376 |
| 6,628,173 B1 * | 9/2003 | Cohen et al. | ................ | 331/25 |
| 6,822,478 B1 * | 11/2004 | Elappuparackal | ................ | 326/46 |
| 2002/0051510 A1 * | 5/2002 | Noguchi | ................ | 375/376 |
| 2003/0118209 A1 * | 6/2003 | Cohen et al. | ................ | 382/100 |
| 2003/0141908 A1 * | 7/2003 | Stong | ................ | 327/141 |
| 2005/0008110 A1 * | 1/2005 | Lake et al. | ................ | 375/371 |

FOREIGN PATENT DOCUMENTS

| | | |
|---|---|---|
| JP | 61-143334 | 9/1986 |
| JP | 61-161779 | 10/1986 |
| JP | 05-235921 | 9/1993 |

(Continued)

*Primary Examiner*—Timothy P. Callahan
*Assistant Examiner*—Cassandra Cox
(74) *Attorney, Agent, or Firm*—Muramatsu & Associates

(57) ABSTRACT

There is provided a phase correction circuit capable of detecting a skew between a data signal and a clock signal without requiring a clock signal as pattern data upon initialization. The phase correction circuit is configured to include a variable delay device 10 to which a data signal in a DDR format is inputted, a first F/F 1 which fetches a delayed data signal in synchronization with the clock signal, a second F/F 2 which fetches the delayed data signal in synchronization with a reverse clock signal, a third F/F 3 which fetches an output signal from the first F/F 1 in synchronization with the clock signal, and a fourth F/F 4 which fetches an output signal from the second F/F 2 in synchronization with the clock signal, and the phase correction circuit further includes a fifth F/F 5 which fetches a rate signal having the same cycle as that of the data signal in synchronization with the clock signal, a sixth F/F 6 which fetches an output signal from the fifth F/F 5 in synchronization with the clock signal, and an AND circuit 8 to which an output signal from the third F/F 3 and an output signal from the sixth F/F 6 are inputted.

5 Claims, 4 Drawing Sheets

FOREIGN PATENT DOCUMENTS

| | | |
|---|---|---|
| JP | 09-005394 | 1/1997 |
| JP | 11-015783 | 1/1999 |
| JP | 11-125660 | 5/1999 |
| JP | 11-203159 | 7/1999 |
| JP | 2000-010849 | 1/2000 |
| JP | 2001-118325 | 4/2001 |

* cited by examiner

PHASE CORRECTION CIRCUIT

This application is a 371 of PCT/JP02/07607 Jul. 26, 2002.

TECHNICAL FIELD

The present invention relates to a circuit (input circuit) receiving a data signal in a DDR (double data rate) format which is transferred between chips or between modules, and more particularly to a phase correction circuit capable of detecting a skew between a data signal and a clock signal and correcting their phase difference without requiring a clock signal as pattern data when setting a delay time of a variable delay device at the time of initialization.

BACKGROUND ART

In recent years, a data signal is transferred in a DDR format between chips or between modules. In the DDR format, the data signal is processed with the both timing of a rise edge and a fall edge of a clock signal. Therefore, transferring the data signal in the DDR format can improve a transfer rate.

Before explaining the present invention, a conventional example of a circuit (input circuit) receiving a data signal in a DDR format will be briefly described with reference to FIG. 4.

As shown in FIG. 4, the input circuit for a data signal in a DDR format is generally constituted of a variable delay device (VD) 10, a first flip-flop (first F/F) 1, a second flip-flop (second F/F) 2, a third flip-flop (third F/F) 3 and a fourth flip-flop (fourth F/F) 4.

A data signal in a DDR format is inputted to the variable delay device. Further, the first F/F 1 fetches a delayed data signal outputted from the variable delay device 10 in synchronization with a clock signal. That is, the data signal is fetched with a timing of a rising edge of the clock signal.

Furthermore, the second F/F 2 fetches the delayed data signal in synchronization with a reverse clock signal obtained by reversing the clock signal. That is, the data signal is fetched with the timing of a fall edge of the clock signal.

Therefore, a phase of the data signal outputted from the second F/F 2 is delayed from a phase of the data signal outputted from the first F/F 2 by a ½ cycle of the clock signal.

Thus, the third F/F 3 fetches an output signal from the first F/F 1 in synchronization with the clock signal. Moreover, the fourth F/F 4 fetches an output signal from the second F/F 2 in synchronization with the clock signal. Since the third and fourth F/F 3 and 4 respectively fetch output signals in synchronization with the clock signal in this manner, the output signal of the first F/F 1 and the output signal of the second F/F 2 can be in phase.

Meanwhile, the data signal in a DDR format is transferred at a high speed. Therefore, in the DDR format, an allowable range of a skew (signal phase shift) between the data signal and the clock signal is very narrow. Thus, in the input circuit, the skew is corrected by delaying the data signal by using the variable delay device 10.

Here, setting a delay time at the time of initialization can be performed by giving predetermined data and a clock as pattern data, gradually changing a delay time of the variable delay device 10 and reading output values of the first and second F/F 1 and 2 each time.

As shown in FIG. 4, the conventional input circuit includes a first AND circuit 11 to which the output signal from the first F/F 1 and a read mode signal are inputted and a second AND circuit 12 to which the output signal from the second F/F 2 and the read mode signal are inputted, thereby reading output values of the first and second F/F 1 and 2.

The output values are read in the following manner. First, the input circuit is operated for a predetermined clock number given from the pattern data, and predetermined data signals are outputted from the variable delay device 10. The outputted data signals are held in the first and second F/F 1 and 2. The clock signals whose number is equal to a predetermined pattern number are generated, and this generation is then terminated (stopped). The data signals held in the first and second F/F 1 and 2 are respectively read through the first and second AND circuits 11 and 12 based on the read mode signals.

Then, the read values and the data signals are compared, and it is judged whether they have been correctly fetched into the first and second F/F 1 and 2, respectively. If the data signals have not been correctly fetched, a delay time is increased in increments of a predetermined time, and the judgment is repeated. Then, a skew is corrected, and a delay time with which the data signals can be correctly fetched is set.

As described above, in the conventional input circuit, since the first and second F/F 1 and 2 judge whether the data signals have been correctly fetched, the clock signals as pattern data must be generated every time the setting of the delay time is changed and judged. Therefore, besides the circuit configuration shown in FIG. 4, a program, a circuit or the like which generates and controls the clock signals as the pattern data is required.

In view of the above-described problems, it is, therefore, an object of the present invention to provide a phase correction circuit capable of easily detecting a skew between a data signal and a clock signal and correcting their phase difference without requiring a clock signal as pattern data upon initialization.

DISCLOSURE OF THE INVENTION

According to the present invention, there is provided a phase correction circuit comprising: a variable delay device to which a data signal in a DDR format is inputted; first fetch means to fetch a delayed data signal outputted from the variable delay device in synchronization with a clock signal; second fetch means to fetch the delayed data signal in synchronization with a reverse clock signal obtained by reversing the clock signal; third fetch means to fetch an output signal from the first fetch means in synchronization with the clock signal; and fourth fetch means to fetch an output signal from the second fetch means in synchronization with the clock signal, wherein the phase correction circuit further comprises: fifth fetch means to fetch a rate signal having the same cycle as that of the data signal in synchronization with the clock signal; and an AND circuit to which an output signal from the third or fourth fetch means and an output signal from the fifth fetch means are inputted.

As described above, according to the input circuit of the present invention, the AND circuit judges the match/mismatch of the rate signal having the same cycle as that of the data signal with the delayed data signal outputted from the third or fourth fetch means. As a result, it is possible to judge whether the delayed data signal has been correctly fetched into each flip-flop without requiring the clock signal as the pattern data. That is, it is possible to detect presence/absence of a skew between the clock signal and the data signal which exceeds an allowable range. Consequently, a skew between the clock signal and the data signal can be detected and a delay time used to correct the skew can be readily set without requiring a program, generating means, controlling means or the like for generating the clock signal as the pattern data at the time of initialization.

Moreover, according to the present invention, there is provided a phase correction circuit comprising: sixth fetch means to fetch an output signal from the AND circuit in synchronization with the clock signal; and a latch circuit which holds an output signal from the sixth fetch means.

As described above, providing the sixth fetch means and the latch circuit can readily fetch a judgment result with a desired timing.

Here, all or some of the fetch means according to the present invention can be constituted of flip-flops. As a result, the present invention can be easily constituted by using the flip-flops which are existing sequence circuits, and the phase correction circuit which has a simple structure and is superior in multiusability and expandability can be provided.

Additionally, the present invention can be carried out as a method comprising: a variable delay step of receiving a data signal in a DDR format, and outputting it as a delayed data signal obtained by delaying the data signal by a predetermined time; a first fetch step to fetch the delayed data signal in synchronization with a clock signal; a second fetch step to fetch the clock signal in synchronization with a reverse clock signal obtained by reversing the clock signal; a third fetch step to fetch an output signal from the first fetch step in synchronization with the clock signal; a fourth fetch step to fetch an output signal from the second fetch step in synchronization with the clock signal; a fifth fetch step to fetch a rate signal having the same cycle as that of the data signal in synchronization with the clock signal; and an AND operation step of receiving an output signal from the third or fourth fetch step and an output signal from the fifth fetch step and obtaining their logical product.

Further, the present invention can be carried out as the method further comprising: a sixth fetch step of fetching an output signal from the AND operation step in synchronization with the clock signal: and a latch step of holding an output signal from the sixth fetch step.

In this manner, the present invention can be carried out as the method which can readily detect a skew between the data signal in a DDR format and the clock signal and correct their phase difference.

BEST MODE FOR CARRYING OUT THE INVENTION

In order to explain the present invention in more detail, a preferred embodiment according to the present invention will now be described with reference to the accompanying drawings.

Figure 1:
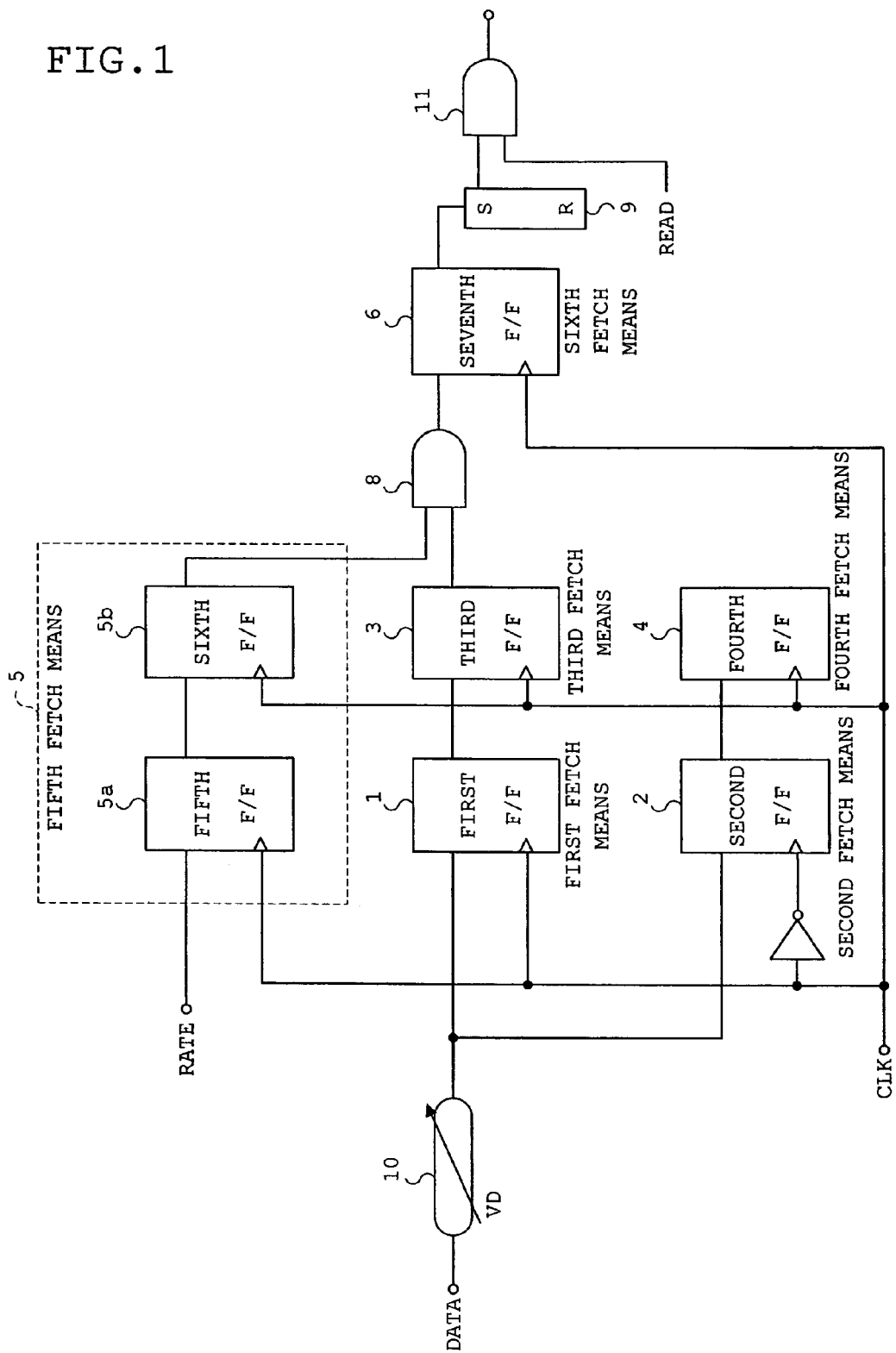
FIG. 1 is a circuit diagram illustrating a structure of a preferred embodiment of a phase correction circuit according to the present invention.

As shown in FIG. 1, a phase correction circuit according to an embodiment of the present invention is constituted of a variable delay device 10, a first flip-flop (first F/F) 1 as first fetch means 1, a second flip-flop (second F/F) 2 as second fetch means 2, a third flip-flop (third F/F) 3 as third fetch means 3, a fourth flip-flop (fourth F/F) 4 as fourth fetch means 4, a fifth flip-flop (fifth F/F) 5a and a sixth flip-flop (sixth F/F) 5b constituting fifth fetch means 5, an AND circuit 8, a seventh flip-flop (seventh F/F) 6 as sixth fetch means 6, and an SR latch circuit 9.

A data signal in a DDR format is inputted to the variable delay device 10 from the outside of the phase correction circuit. Then, the variable delay device 10 delays the data signal by a set delay time Td, and outputs a result as a delayed data signal.

Figure 2:
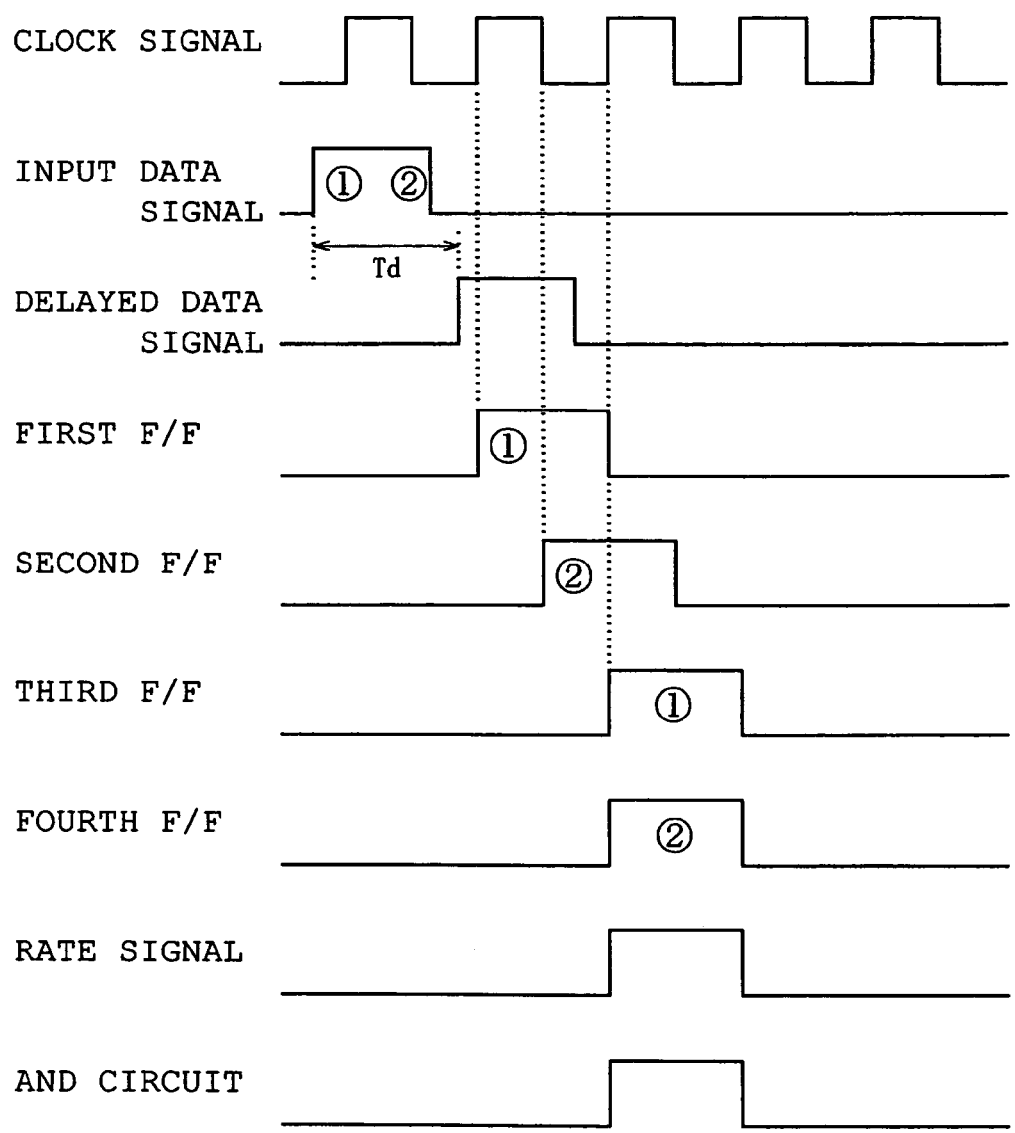
FIG. 2 is a timing chart illustrating an operation of the preferred embodiment of the phase correction circuit according to the present invention.

Further, the first F/F 1 as the first fetch means 1 fetches the delayed data signal outputted from the variable delay device 10 in synchronization with a clock signal. That is, as shown in FIG. 2, the data signal is fetched with a timing of a rising edge of the clock signal.

Furthermore, the second F/F 2 as the second fetch means 2 fetches the delayed data signal in synchronization with a reverse clock signal obtained by reversing the clock signal. That is, as shown in FIG. 2, the data signal is fetched with a timing of a fall edge of the clock signal.

Therefore, a phase of the data signal outputted from the second F/F 2 is delayed from a phase of the data signal outputted from the first F/F 1 by a ½ cycle of the clock signal.

Thus, the third F/F 3 as the third fetch means 3 fetches an output signal from the first F/F 1 in synchronization with the clock signal. Moreover, the fourth F/F 4 as the fourth fetch means 4 fetches an output signal from the second F/F 2 in synchronization with the clock signal. Since both the third and fourth F/F 3 and 4 fetch the output signals in synchronization with the clock signal in this manner, the output signal from the first F/F 1 and the output signal from the second F/F can be in phase.

On the other hand, the fifth F/F 5a on the front stage as the fifth fetch means 5 fetches a rate signal having the same cycle as that of the data signal in synchronization with the clock signal. Additionally, the sixth F/F 5b on the rear stage as the fifth fetch means 5 fetches an output signal from the fifth F/F 5a in synchronization with the clock signal.

The AND circuit 8 are inputted the data signal outputted from the third F/F 3 and a rate signal (RATE) outputted from the sixth F/F 5b. Then, when a value of the data signal matches with that of the rate signal, an output from the AND circuit 8 becomes "H" (or "1") as shown in FIG. 2.

Judging the match/mismatch of the rate signal having the same cycle as that of the data signal and the delayed data signal outputted from the third or fourth flip-flop by using the AND circuit can judge whether the delayed data signal has been correctly fetched into each flip-flop without requiring the clock signal as pattern data like the prior art.

It is to be noted that the rate signal having the same cycle as that of the data signal is utilized if the data signal has been correctly fetched into the first and third F/F 1 and 3. Therefore, the data has been also correctly fetched into the second and fourth F/F 2 and 4 in principle.

However, both of the output from the third F/F 2 and the output from the fourth F/F 4 are compared with the rate signal and judged, a judgment result with the higher reliability can be obtained.

Moreover, in this embodiment, an output from the AND circuit 8 is fetched into the seventh F/F 6 as the sixth fetch means 6 in synchronization with the clock signal. Then, an output from the seventh F/ 6 is held in the SR latch circuit 9. As a result, inputting a read mode signal (READ) to the AND circuit 11 enables a signal value held in the SR latch circuit to be readily fetched with a desired timing. Consequently, a judgment result can be acquired any time.

Figure 3A:
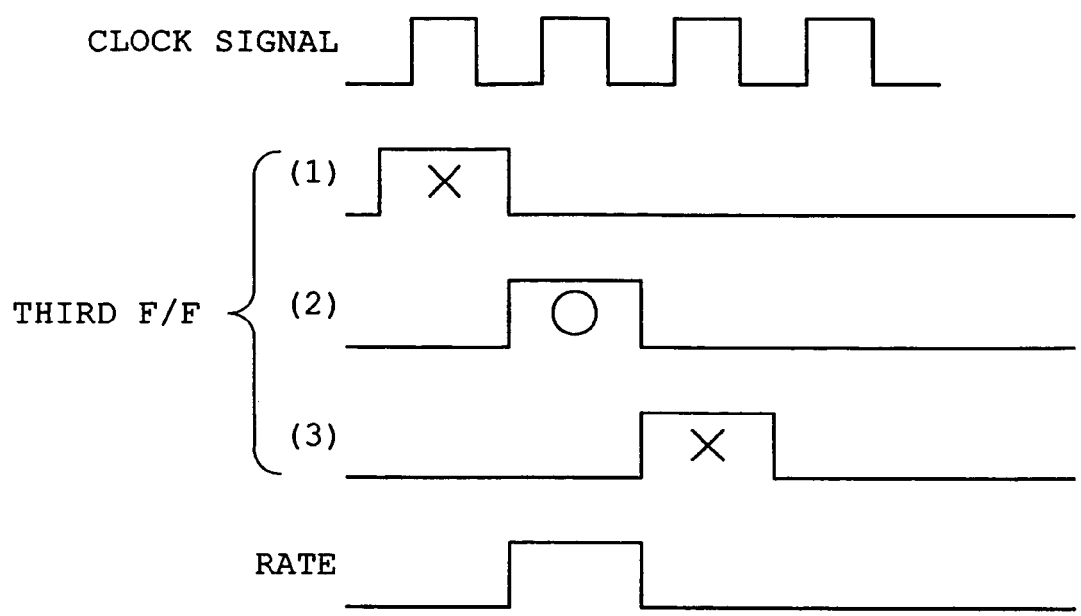
FIGS. 3(A) and (B) are graphs illustrating an optimum delay time.

Here, as indicated by (1) in FIG. 3(A), if the delay time set in the variable delay circuit 10 is too short, output of the data signal and output of the rate signal (RATE) do not match with each other in timing, and it is determined that the data signal has not been correctly fetched into the first flip-flop 1 and the like.

Additionally, if the set delay time is too long, output of the data signal and output of the rate signal (RATE) do not match with each other in timing as indicated by (3) in FIG. 3(A), and it is determined that the data signal has not been correctly fetched into the first flip-flop 1 and the like.

On the contrary, if the set delay time is adequate, output of the data signal and output of the rate signal (RATE) match with each other in timing as indicated by (2) in FIG. 3(A), and it is determined that the data signal has been correctly fetched into the first flip-flop 1 and the like.

Figure 3B:
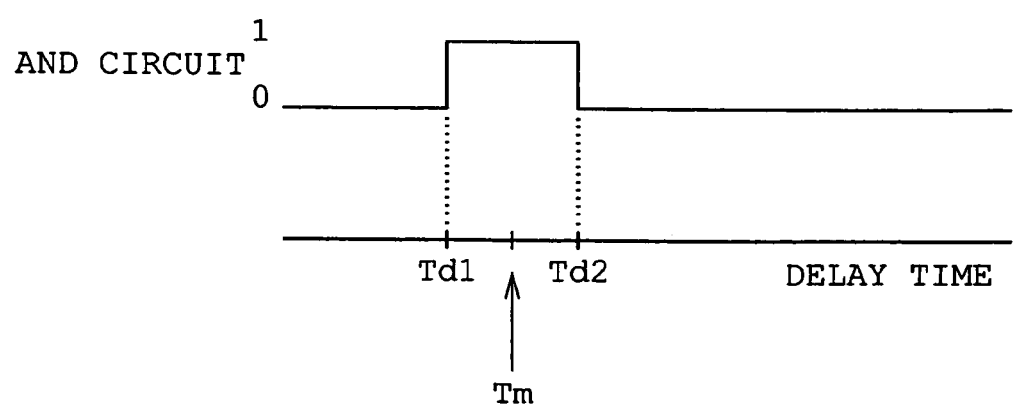
Figure 4:
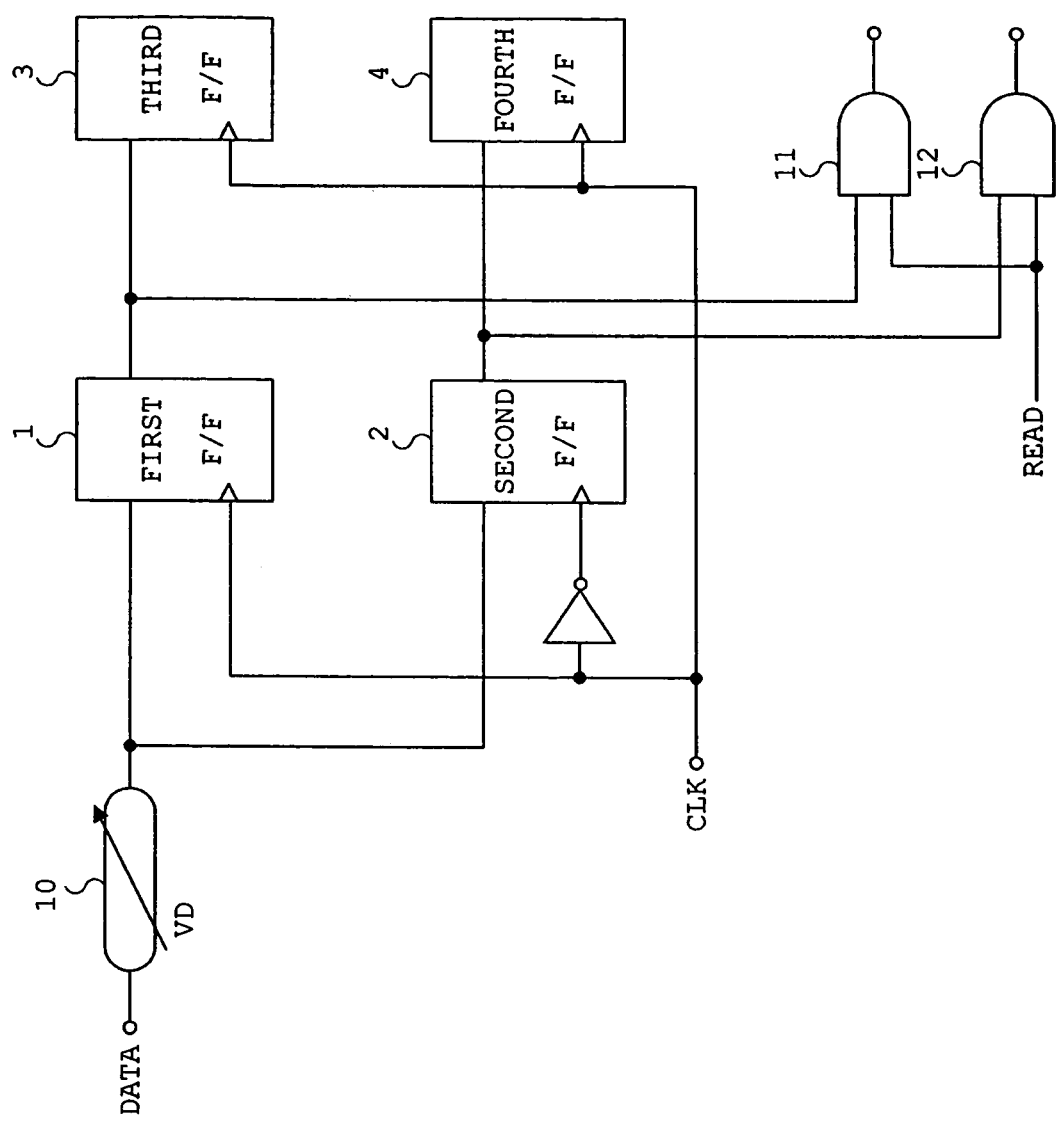
FIG. 4 is a circuit diagram of an input circuit according to a prior art.

Meanwhile, since the rate signal (RATE) has the same cycle as that of the data signal, it is determined that the data signal has been fetched correctly in a predetermined delay time range if the delay time is gradually shifted. In the example illustrated in FIG. 3(B), an output value of the AND circuit 8 is "1" in a range of the delay times Td1 to Td2. Therefore, it is determined that the data signal has been fetched correctly in this range.

Thus, if an intermediate value $Tm(=(Td1+Td2)/2)$ between the delay times Td1 and Td2 is set in the variable delay circuit 10, an optimum delay time used to correct a skew can be set.

In the above-described embodiment, although the description has been given as to the example that the present invention is constituted under the specific conditions, the present invention can be modified in many ways.

For example, although the first to sixth fetch means are all constituted of the flip-flops in the foregoing embodiment (see the first to seventh F/F shown in FIG. 1), the fetch means according to the present invention are not restricted to only the flip-flops, and any other sequence circuits (e.g., latch circuits) and the like can be used. That is, all or some of the fetch means according to the present invention can be constituted of the flip-flops and, at the same time, all or some of these means can be also constituted of any other circuits.

Further, although the description has been given as to the example that the output signal from the third fetch means (third flip-flop) is compared with the rate signal in the foregoing embodiment, the output signal from the fourth fetch means (fourth flip-flop) may be compared with the rate signal in the present invention. Furthermore, the output signals from both the third and fourth fetch means may be compared with the rate signal in the present invention.

Moreover, although the two flip-flops (the fifth F/F and the sixth F/F) on the front and rear stages are provided as the fifth fetch means in the foregoing embodiment, the F/F on the rear stage outputs an output of the F/F on the front stage with a predetermined timing (outputs after holding for one clock), but this may be eliminated. That is, the fifth fetch means may be constituted of only a single F/F.

INDUSTRIAL APPLICABILITY

As described above, the phase correction circuit according to the present invention uses the AND circuit to judge the match/mismatch of the rate signal having the same cycle as the data signal and the delayed data signal outputted from the third or fourth fetch means. As a result, it is possible to judge whether the delayed data signal has been correctly fetched into each flip-flop without requiring the clock signal as pattern data. That is, it is possible to detect presence/absence of a skew between the clock signal and the data signal which exceeds an allowable range. As a result, the delay time used to correct a skew between the data signal and the clock signal can be readily set without requiring generating means, controlling means or the like for the clock signal as pattern data at the time of initialization, the present invention is useful as a circuit which receives/transmits the data signal in a DDR format, and it is suitable for initialization of the high-speed DDR data transmission in particular.

The invention claimed is:

1. A phase correction circuit comprising:
   a variable delay device to which a data signal in a DDR format is inputted;
   first fetch means to fetch a delayed data signal outputted from the variable delay device in synchronization with a clock signal;
   second fetch means to fetch the delayed data signal in synchronization with a reverse clock signal obtained by reversing the clock signal;
   third fetch means to fetch an output signal from the first fetch means in synchronization with the clock signal; and
   fourth fetch means to fetch an output signal from the second fetch means in synchronization with the clock signal,
   the phase correction circuit further comprising:
   fifth fetch means to fetch a rate signal having the same cycle as that of the data signal in synchronization with the clock signal; and
   an AND circuit to which an output signal from the third or fourth fetch means and an output signal from the fifth fetch means are inputted.

2. The phase correction circuit according to claim 1, further comprising:
   sixth fetch means to fetch an output signal from the AND circuit in synchronization with the clock signal; and
   a latch circuit which holds an output signal from the sixth fetch means.

3. The phase correction circuit according to claim 1 or 2, wherein all or some of the fetch means consist of flip-flops.

4. A phase correction method comprising:
   a variable delay step of receiving a data signal in a DDR format, and outputting it as a delayed data signal obtained by delaying the data signal by a predetermined time;
   a first fetch step to fetch the delayed data signal in synchronization with a clock signal;
   a second fetch step to fetch the delayed data signal in synchronization with a reverse clock signal obtained by reversing the clock signal;
   a third fetch step to fetch an output signal from the first fetch step in synchronization with the clock signal;

a fourth fetch step to fetch an output signal from the second fetch step in synchronization with the clock signal;
a fifth fetch step to fetch a rate signal having the same cycle as that of the data signal in synchronization with the clock signal; and
a logical product step of receiving an output signal from the third or fourth fetch step and an output signal from the fifth fetch step, and obtaining their logical product.

5. The phase correction method according to claim 4, further comprising:
a sixth fetch step to fetch an output signal from the logical product step in synchronization with the clock signal; and
a latch step of holding an output signal from the sixth fetch step.

* * * * *